US008796873B2

(12) United States Patent
Zhu

(10) Patent No.: US 8,796,873 B2
(45) Date of Patent: Aug. 5, 2014

(54) WIND TURBINE WITH A PRIMARY AND A SECONDARY GENERATOR AND METHOD OF OPERATING SUCH WIND TURBINE

(71) Applicant: Envision Energy (Denmark) ApS, Silkeborg (DK)

(72) Inventor: HongDong Zhu, Silkeborg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 0 days.

(21) Appl. No.: 13/863,539

(22) Filed: Apr. 16, 2013

(65) Prior Publication Data

US 2013/0270826 A1 Oct. 17, 2013

(30) Foreign Application Priority Data

Apr. 16, 2012 (DK) .................................. 2012 70189

(51) Int. Cl.
*F03D 9/00* (2006.01)
*H02P 9/04* (2006.01)
*H02P 9/00* (2006.01)

(52) U.S. Cl.
CPC ............... *H02P 9/007* (2013.01); *F03D 9/003* (2013.01); *F03D 9/002* (2013.01); *Y02E 10/725* (2013.01)
USPC ........................................... 290/44; 290/1 C

(58) Field of Classification Search
CPC ....... F03D 9/003; F03D 9/002; F03D 7/0284; F03D 7/04; H02P 9/007; Y02E 10/763; H02J 3/386; H02K 7/1838
USPC ..................................................... 290/1 C, 44
See application file for complete search history.

(56) References Cited

U.S. PATENT DOCUMENTS

| 4,446,376 | A | * | 5/1984 | Baker | 290/44 |
| 4,572,961 | A | * | 2/1986 | Borger | 290/4 R |
| 4,585,950 | A | * | 4/1986 | Lund | 290/44 |
| 4,613,760 | A | * | 9/1986 | Law | 290/1 C |
| 4,908,565 | A |   | 3/1990 | Cook et al. | 322/10 |
| 5,140,856 | A | * | 8/1992 | Larsen | 73/455 |
| 6,304,002 | B1 | * | 10/2001 | Dehlsen et al. | 290/1 C |
| 6,707,170 | B2 |   | 3/2004 | Fukaya | 290/40 A |
| 7,285,871 | B2 | * | 10/2007 | Derouineau | 290/52 |
| 7,481,062 | B2 | * | 1/2009 | Gaines et al. | 60/792 |

(Continued)

FOREIGN PATENT DOCUMENTS

CN 101207313 A 6/2008

*Primary Examiner* — Pedro J Cuevas
(74) *Attorney, Agent, or Firm* — Roberts Mlotkowski Safran & Cole, P.C.; David S. Safran

(57) ABSTRACT

This invention relates to a wind turbine of variable speed type including: a wind turbine tower; a nacelle on said wind turbine; a wind turbine rotor hub rotatably mounted at said nacelle, said wind turbine rotor hub having at least one wind turbine blade mounted thereon and a shaft coupled to said wind turbine rotor hub and to, optionally via a gear box, a primary generator which via power lines has a primary stator electrically connected to a grid connection and a primary rotor electrically connected to a back-to-back converter at a generator side converter end wherein the back-to-back converter at a grid side converter end is electrically connected to the grid connection. The wind turbine further includes a secondary generator coupled to the shaft via a mechanical coupling and electrically connected to the primary rotor of the primary generator and the generator side converter end of the back-to-back converter.

15 Claims, 6 Drawing Sheets

(56) References Cited

U.S. PATENT DOCUMENTS

| | | | |
|---|---|---|---|
| 7,518,257 B2 | 4/2009 | Guey et al. | 290/44 |
| 7,552,582 B2 * | 6/2009 | Eick et al. | 60/39.163 |
| 2003/0030416 A1 | 2/2003 | Fukaya | 322/24 |
| 2013/0169289 A1 * | 7/2013 | Linares Fano et al. | 324/537 |
| 2013/0279222 A1 * | 10/2013 | Cai et al. | 363/78 |

\* cited by examiner

WIND TURBINE WITH A PRIMARY AND A SECONDARY GENERATOR AND METHOD OF OPERATING SUCH WIND TURBINE

BACKGROUND OF THE INVENTION

1. Field of the Invention

The present invention relates to a wind turbine with a primary and a secondary generator, a method of retrofitting a wind turbine having a primary generator to also have a secondary generator, and method of operating such wind turbines.

2. Description of Related Art

In particular, the present invention relates to a wind turbine of variable speed type comprising: a wind turbine tower; a nacelle provided on said wind turbine; a wind turbine rotor hub rotatably mounted at said nacelle, said wind turbine rotor hub having at least one wind turbine blade mounted thereon and a shaft coupled to said wind turbine rotor hub and to, optionally via a gear box, a primary generator which via power lines has a primary stator electrically connected to a grid connection and a primary rotor electrically connected to a back-to-back converter at a generator side converter end and wherein the back-to-back converter at a grid side converter end is electrically connected to the grid connection. The wind turbine further comprises a secondary generator coupled to the shaft via a mechanical coupling and electrically connected to the primary rotor of the primary generator and to the generator side converter end of the back-to-back converter.

The background of the invention is a hybrid power-generating device, known from U.S. Pat. No. 7,518,257 B2 which discloses a wind turbine with a primary electrical generator and an auxiliary generator with different characteristics. The primary generator is a double-feed induction generator (DFIG) configuration while the secondary generator is a synchronised generator (SG) configuration. The primary generator is coupled to a first generator side of a back-to-back converter while the secondary generator is coupled to a second generator side of the back-to-back converter. The secondary generator is coupled to the DC link in the converter and is used to supply power to the grid side of the converter in the event of a fault in the drive train or a power drop in the grid. This configuration has the drawback that it requires the use of two different generator sides each designed to match the power range of a particular generator type. This in turn increases the complexity and number of components of the power converter. This configuration does not provide means for a smooth transition when the DFIG generator is switched in which may introduce power or moment spikes in the drive train resulting in faults during operation.

It is well known that permanent magnet generators are expensive and that full scale converter wind turbine systems are expensive.

One well known solution to this is a DFIG configuration where stator of the generator is connected directly to the grid, and the rotor is connected to a back-to-back converter of a smaller size. This configuration is well known and advantageous in that it in comparison with a full scale converter configuration only requires a converter that is about one third of the size of the converter needed in a full scale configuration where all the power is converted. Hence, the converter becomes smaller, more effective and much more cost effective.

However, the DFIG configuration has a drawback in that a wind turbine does not produce electricity at low wind speeds.

In particular, off the shelf DFIG-systems exist and are readily available in the MW-power range.

Generators with permanent magnets (PM) exist and are advantageous, because they do not need exciter power, and hence in wind turbines have a relatively high efficiency at all wind speeds. However, PM-based generators are expensive due to the high costs for systems in the MW-power range.

SUMMARY OF THE INVENTION

It is an object of the present invention to provide a wind turbine of variable speed type having relative high efficiency over a large range of wind speeds starting from low wind speeds down to say about 2 m/s.

A further object on the present invention is to provide a wind turbine of variable speed type that is effective and has a reasonable size in regards to costs and power range and operational at higher wind speeds up to say about 20 m/s.

It is an object of the present invention to provide a wind turbine of a variable speed type that is easily controllable over a large range of wind speeds starting from low wind speeds.

It is an objective of the present invention to provide a wind turbine of variable speed that is reliable and effective at low wind speeds say below 3-6 or 5-6 m/s as well as at higher wind speeds.

It is an object of the present invention to provide a method of extending the usability of an existing wind turbine with a variable speed; and in particular range from 1 MW and preferably from 1.5 MW and above.

It is an object of the present invention to provide a method of controlling a wind turbine with variable speed to provide a relatively high efficiency over a larger range of wind speed starting from low wind speeds down to say about 2 m/s.

Accordingly this is achieved by a wind turbine of variable speed type comprising:
  a wind turbine tower;
  a nacelle provided on said wind turbine;
  a wind turbine rotor hub rotatably mounted at said nacelle, said wind turbine rotor hub having at least one wind turbine blade mounted thereon;
  a shaft coupled to said wind turbine rotor hub and to, optionally trough a gear box,
  a primary generator which via power lines has a primary stator electrically connected to a grid connection and a primary rotor electrically connected to
  a back-to-back converter at a generator side converter end and wherein the back-to-back converter at a grid side converter end is electrically connected to the grid connection;
  wherein a secondary generator coupled to the shaft via a mechanical coupling and electrically connected to the primary rotor of the primary generator and the generator side converter end of the back-to-back converter.

Thereby, a wind turbine configuration is provided, which configuration allows a higher efficiency at a larger range of wind speeds in that the primary generator provides high efficiency at higher winds speeds, and the secondary generator provides high efficiency at lower wind speeds due to the efficient connection of the primary generator and the secondary generator and the cross utilisation of the back-to-back converter.

In particular, the configuration is suitable for wind turbines with a rated power above 1 MW, since those turbines have effective drive trains and system components including reliable back-to-back converter systems.

By variable speed type wind turbine is understood a wind turbine where the wind rotor can be operated at variable speed by use of a back-to-back converter or inverter inserted between the generator and the grid connection point for enabling the wind turbine to be connected to a power grid.

The back-to-back converter is typically about one fourth to one third of the rated power and configured to balance or match the power generated by a generator to the power conditions of a grid.

According to an embodiment of the wind turbine, it is special in that the primary generator is a DFIG-generator.

Hence, well known standard generator technology can be used as part of a drive train of the wind turbine.

In particular when the wind speed is above say 5-6 m/s, the turbine can operate in a pure DFIG-mode where the stator of the DFIG connects to the grid, and the rotor connects to the back-to-back converter.

Such pure DFIG-mode is advantageous for typical wind turbines at 1.0 MW or above, and in particular advantageous for a wind turbine with a nominal power of 1.5 MW which at wind speeds of about 5-6 m/s and above has a rotor speed of about 10-20 rpm yielding a nominal power of 1.5 MW until wind speeds at about 21 m/s, where the wind turbine cuts out.

According to an embodiment of the wind turbine, it is special in that said secondary generator is a permanent magnet generator, such as a PMHS, PMMS, PMDD or alternative or equivalent permanent magnet generator.

The permanent magnet generator has a mechanical coupling to the shaft and its stator electrically connected between the primary generator and the generator side converter end of the back-to-back converter.

Hence, well known standard permanent magnet generator technology at relatively small size can be used.

In particular when the wind speed is below said 5-6 m/s, the turbine can operate in a pure PM-mode where the stator of the DFIG disconnects to the grid, and the rotor disconnects to the back-to-back converter.

In the PM-mode, the stator of the PM-generator will connect to the back-to-back converter and will work at full power conversion mode. Hence, the rotor speed of the rotor can be reduced to lower (than 5-6 m/s) and even very low (say 1-2 m/s) wind speeds.

According to an embodiment of the wind turbine, it is special in that said secondary generator has a maximum power output Ps of between 50 kW and 230 kW, and/or the primary generator has a maximum power output Pp of at least 1 MW, preferably about 1.5 MW.

Thereby optimal usage of the back-to-back converter can be achieved since the back-to-back converter typically is designed to about 20-35% of the rated power of the primary generator, and hence has a capacity to take the full power of the permanent magnet.

Furthermore, starting with a secondary generator that has a maximum power output of Ps of between 50 kW and 230 kW and an over dimensioned back-to-back converter, which is designed to match the primary generator with an output of about 1 MW or preferably 1.5 MW, the permanent magnet generator will be able to harvest energy in the lower wind speed ranges.

According to an embodiment of the wind turbine, it is special in that said wind turbine further comprises a controller with controlling capacities and connection means to:
- a first switch between the primary generator and the grid connection;
- a second switch between generator side end of the back-to-back converter and the secondary generator;
- a third switch between the generator side converter end of the back-to-back converter and the primary generator;

and which controller and switches are configured to switch power on/off said primary generator and secondary generator to the back-to-back converter and a grid.

Thereby, the coupling in and out of the primary and secondary generators can be controlled. In one aspect of the invention, the controller and switch configuration can control the wind turbine so that it operates in a DFIG-mode or operates in a PM-mode.

Furthermore, the controller and switches can be used to start, stop, power-up, and power-down the turbine.

In particular, the controller and switch can be used to control the operational switch between the two modes, i.e. the pure DFIG-mode and the pure PM-mode.

In one aspect, the controller stops the turbine, i.e. initiates a power-down sequence that leads to a stop of the turbine. This is followed by a power-up sequence that leads to a start of either the pure DFIG-mode or the pure PM-mode.

In one aspect, the controller reduces the power output to zero and keeps the rotor speed at a certain value and hereafter opens and closes switches as disclosed to be either in the DFIG-mode or in the PM-mode. Thereafter connecting to a grid and ramping the power to the needed or desired power level.

In a preferred embodiment, there is a cut-in (or mode shift) threshold that is different from a cut-out (or mode shift) threshold thereby avoiding frequent transitions between the two modes.

In an aspect, there is a start-up procedure or sequence depending on an input of the wind speed. The start-up sequence can be executed as disclosed above. The wind speed can be measured by an anemometer or an equivalent wind speed measuring device or inferred by the rotor speed.

In an aspect where the wind speed is low, say 3-5 m/s, a typical three bladed rotor with a nominal power of about 1.5 MW will rotate about 6-7 rpm, there is further sequence and configuration that will pitch the blades for a so-called fast-passing trough, thereby reducing or eliminating the risk of hitting a mechanical resonance frequency of the tower when a blade passes the tower. This sequence can be termed a 3P-frequency mode.

Each of the mentioned sequences or operational modes and derivatives thereof are suitable for being programmed and as such constitute methods of operating the wind turbine.

According to an embodiment of the wind turbine, it is special in that said controller is configured to control and continuously regulate at least one of the said switches for a power flow between off (zero power throughput) and on (max power throughput).

Thereby, mixed operational modes can be obtained. Furthermore, frequent switching can be avoided and smoother transitions can be achieved, thereby potentially reducing or even eliminating power spikes downstream the electrical part of the drive train as can mechanical spikes in moments be potentially reduced, thereby overall reducing the introduction of faults (electrical or mechanical) during operation.

According to an embodiment of the wind turbine, it is special in that said controller further is configured to control said generator side converter end of the back-to-back converter via generator side controls and/or to control said grid side converter end of the back-to-back converter via grid side controls and/or to control the rotation of the wind turbine rotor by means of rotor controls.

Thereby is provided for an overall and integrated control of the power system of the wind turbine and the cut-in and cut-out to and from the grid.

In an aspect of the invention, measures of the grid condition are processed and used to initiate a switch from one operational mode to another mode. I.e. from say a pure DFIG-mode to a pure PM-mode or vice versa.

According to an embodiment of the wind turbine, it is special in that said secondary generator comprises a secondary generator shaft mechanically coupled by a coupling to a primary generator shaft; which mechanical coupling preferably is a toothed belt type coupling.

Thereby is provided an effective and simple mechanical coupling or transfer of energy from the primary generator shaft to the secondary generator. Furthermore, the secondary generator is electrically coupled to the back-to-back converter in a way utilising the power lines between the primary generator and the back-to-back converter.

According to an embodiment of the wind turbine, it is special in that said secondary generator comprises a secondary generator shaft mechanically coupled by a coupling directly to a primary generator shaft; which mechanical coupling preferably is a one-to-one directly coupling such as a shaft extension.

Thereby is provided an effective and simple direct coupling or transfer of energy from the rotor shaft to the secondary generator.

In a further aspect, there is a gearing arrangement or a coupling arrangement between the main generator shaft and the secondary generator shaft.

According to an embodiment of the wind turbine, it is special in that said secondary generator comprises a secondary generator shaft mechanically coupled by a coupling to the shaft; which mechanical coupling preferably is a secondary gear box type coupling.

Thereby is provided an effective and simple coupling or transfer of energy from the rotor shaft to the secondary generator. This configuration is particularly advantageous in that it provides two more distinct drive trains in that the secondary generator can be coupled to the rotor shaft more directly. In principle, the wind turbine can be operated whilst maintaining either of the primary or secondary generator systems.

According to an embodiment of the wind turbine, it is special in that the wind turbine has fully or partial pitchable blades.

These can be pitched to reduce loads during switching between the operational modes.

The objective of the invention is met by a method of producing a wind turbine as disclosed and comprising the steps of:
  providing a wind turbine of variable speed type comprising:
    a wind turbine tower;
    a nacelle provided on said wind turbine;
    a wind turbine rotor hub rotatably mounted at said nacelle, said wind turbine rotor hub having at least one wind turbine blade mounted thereon;
    a shaft coupled to said wind turbine rotor hub and to, optionally through a gear box,
    a primary generator which via power lines has a primary stator directly connected to a grid connection and a primary rotor directly connected to
    a back-to-back converter at a generator side converter end and which back-to-back converter at a grid side converter end is connected to the grid connection;
  providing a secondary generator; and
  retrofitting the secondary generator to the shaft or the primary generator shaft by a mechanical coupling and connecting the secondary generator to the power lines between the primary generator and the back-to-back converter and
  retrofitting
    a first switch between the primary generator and the grid connection;
    a second switch between generator side end of the back-to-back converter and the secondary generator;
    a third switch between the generator side converter end of the back-to-back converter and the primary generator; and which controller and switches are configured to switch power on/off from said primary generator and secondary generator to back-to-back converter and a grid; and
  retrofitting the controller to control the back-to-back converter via generator/grid side controls.

Thereby existing wind turbines can be re-configured to allow for existing hardware to have been further utilised by adding a secondary generator, thereby extending the operational range and the overall power output of the wind turbine.

In particular wind turbines with a nominal power of 1.5 MW are suited for such conversion, since it has been found that they provide enough energy to justify such action of retrofitting.

In particular wind turbines of the DFIG-type as the primary generator can advantageously be added a permanent magnet generator as the secondary generator using a configuration as disclosed or variants thereof.

In a particular embodiment the controller is further retrofitted to control the rotation of the wind turbine rotor by means of rotor controls.

Thereby providing a control method which regulates the power output of the wind turbine during the transition between different operational modes. In one aspect, the rotor controls allows the controller to reduce the power output to zero and keeps the rotor speed at a certain value after which the switches to be in either the DFIG-mode or in the PM-mode. Thereafter connecting to a grid and ramping the power to the needed or desired power level.

Accordingly the objective of the invention is met by a method of operating a wind turbine as disclosed wherein
  the primary generator is coupled to a wind turbine rotor and configured to give a power output $P_p$ when the wind turbine rotor experiences a wind speed between a minimum primary wind speed $Wp_{MIN}$ and a maximum primary wind speed $Wp_{MAX}$; and
  the secondary generator is coupled to a wind turbine rotor and configured to give a power output $P_s$ when the wind turbine rotor experiences a wind speed between a minimum secondary wind speed $Ws_{MIN}$ and a maximum secondary wind speed $Ws_{MAX}$;
  and which primary generator and secondary generators are configured to produce a total power output P; where the method of operating comprises the steps of
  operating the wind turbine in a primary operation mode in which the power output P is from the primary generator when the wind speed is above a decoupling wind speed $W_{decoupling}$;
  operating the wind turbine in a secondary operation mode in which the power output P is from the secondary generator when the wind speed is above a decoupling wind speed $W_{decoupling}$; and where the decoupling wind speed $W_{decoupling}$ is between the minimum primary wind speed $Ws_{MIN}$ and the maximum secondary wind speed $Ws_{MAX}$.

Thereby the wind turbine can operate in either a primary mode where the energy from the rotor is transferred to the primary generator or the wind turbine can operate in a secondary mode where the energy from the rotor is transferred to secondary generator.

In one aspect of the invention the method of operating is performed using a wind turbine according as disclosed.

In a particular embodiment the primary generator is a DFIG and hence the primary mode is a DFIG-mode.

In a particular embodiment the secondary generator is a PM-generator and hence the secondary mode is a PM-mode.

According to an embodiment of the method of operating a wind turbine, the wind turbine switches from one to the other operation mode comprising the steps of:
  detecting a passing of the decoupling wind speed $W_{decoupling}$,
  stopping the rotation of the wind turbine rotor of the wind turbine,
  restarting the rotation of the wind turbine rotor of the wind turbine by
  entering the primary operation mode if the wind speed W is at or above the decoupling wind speed $W_{decoupling}$ or
  entering the secondary operation mode if the wind speed W is below the decoupling wind speed $W_{decoupling}$.

Thereby minimising the overall loads and strains on the system whilst changing operational mode. Another advantage is to reduce the sizes of electrical and mechanical switches needed to switch between modes.

According to an embodiment of the method of operating a wind turbine, the wind turbine switches from one to the other operation mode comprising the steps of:
  reducing the power output P to zero whilst keeping the wind turbine rotor at a certain rotational speed
  switch on first switches and third switches to connect the primary generator to a grid and ramp the power to the required power level
  operate in the primary operation mode
or
  switch on second switches to connect the second generator to a grid and ramp the power to the required power level
  operate in the secondary operation mode.

Thereby obtaining a robust method of switching that minimises the forces on the wind turbine during the transition from one mode to another.

According to an embodiment of the method of operating a wind turbine it involves pitching fully or partial pitchable blades.

The invention is described by example only and with reference to the drawings, wherein:

DETAILED DESCRIPTION OF THE INVENTION

Figure 1:
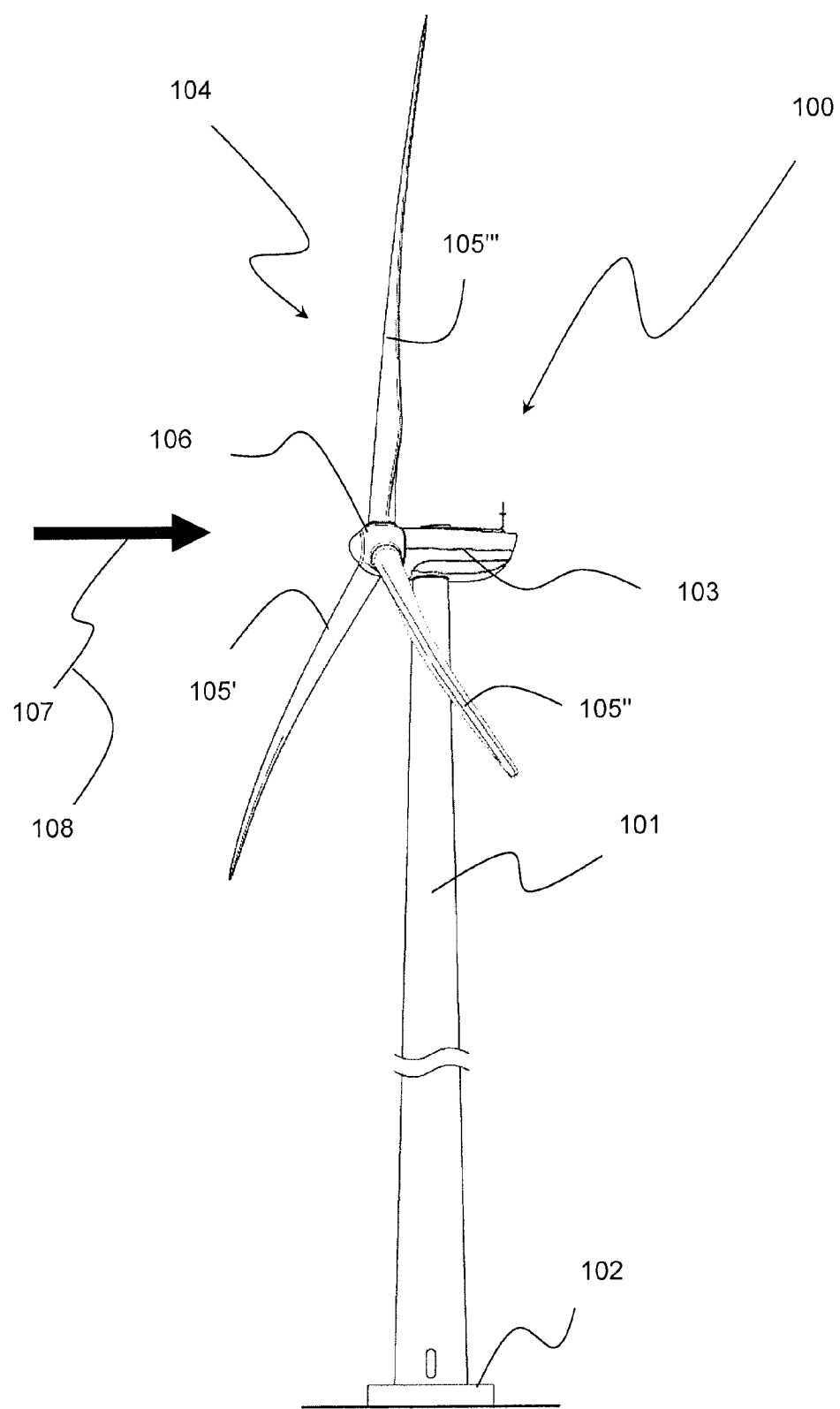
FIG. 1 shows a wind turbine.

FIG. 1 shows a wind turbine 100 with a tower 101 raising from a foundation 102 and ended in a nacelle 103 with a wind turbine rotor 104 comprising, in this embodiment, three blades 105', 105", 105''' assembled in a hub 106.

The nacelle 103 is rotably mounted on the tower 101 configured to face the wind 108 so that the wind 107 will rotate the turbine rotor 104 with a rotational speed depending on the wind speed 108.

Figure 2:
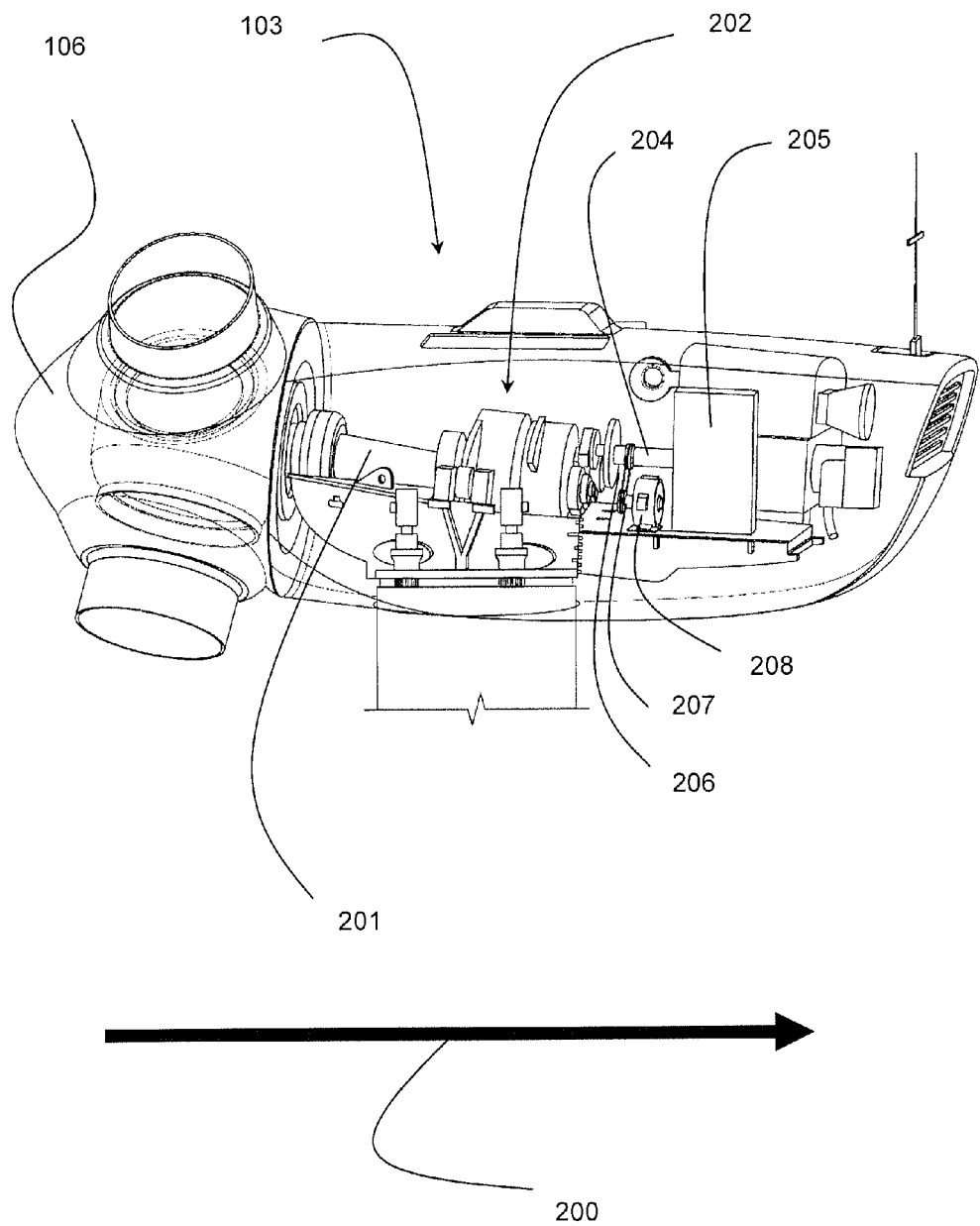
FIG. 2 shows how the shaft is coupled to the primary generator and the secondary generator.

FIG. 2 shows an embodiment of a drive train 200 placed in the nacelle 104 of the wind turbine 100. The drive train 200 connects the hub 106 via a shaft 201 to a gear box 202 that transforms the power to a primary generator shaft 204 that drives a primary generator 205. In this embodiment, the primary generator shaft 204 transfers power via a mechanical coupling 206 made as a toothed belt type arrangement to a secondary generator shaft 207 that drives a secondary generator 208.

The primary generator 205 is a Doubly Fed Induction Generator (DFIG) type generator. The secondary generator 208 is Permanent Magnet Motor System type generator.

Figure 3:
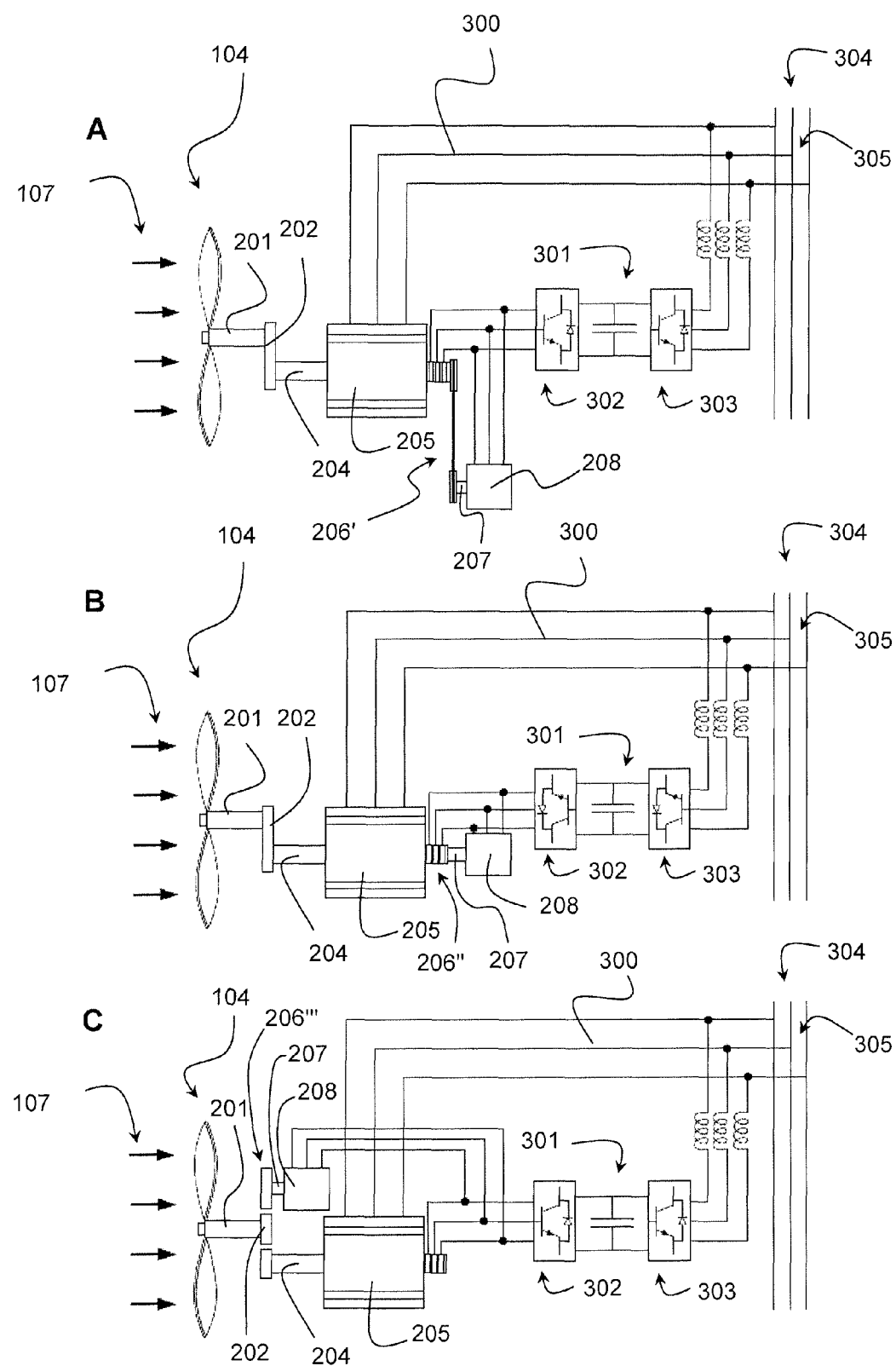
FIG. 3 shows in A, B, and C schematic layouts of configurations of the primary generator and the secondary generator.

FIG. 3 shows three different embodiments of primary and secondary generator configurations. The embodiments in A, B, and C are exemplified by schematic layouts of configurations of the drive train 200 for a wind 107 interacting with the wind turbine rotor 104 transferring power to the shaft 201 and from there to a primary generator 205 and a secondary generator 208.

In all embodiments the primary generator 205 and the secondary generator 208 are connected via power lines 300 suitable for conducting power at the required levels to a back-to-back converter 301 in a configuration where the generators 205, 208 connect to the back-to-back converter 301 at a generator side converter end 302 and which back-to-back converter 301 at its grid side converter end 303 connects to a grid 304 at a grid connection 305. An electric output of the primary generator 205 is directly coupled to the grid connection 305 point via direct power lines 300. Furthermore, an electric power output from the primary generator 205 is coupled to the back-to-back converter 301 via power lines 300.

In the embodiment shown in FIG. 3 A, the primary generator shaft 204 of the primary generator 205 interacts with the shaft 201 via a gearbox 202 that transforms the power to a primary generator shaft 204.

Furthermore, the primary generator shaft 204 interacts with a mechanical coupling 206 that in this embodiment is a toothed belt arrangement 206' that transfers power from the primary generator shaft 204 to the secondary generator shaft 207 that drives the secondary generator 208. The electric output from the secondary generator 208 is directly coupled to the power lines 300 between the output of the primary generator 205 and the generator side converter end 302.

FIG. 3 B shows another embodiment in which the secondary generator shaft 206 is directly mechanical coupled or engaged to the primary generator shaft 204 via a shaft extension 206". The electric output from the secondary generator 208 is directly coupled to the power lines 300 between the output of the primary generator 205 and the generator side converter end 302.

FIG. 3 C shows another embodiment in which the second generator shaft 207 interacts with the shaft 201 via a mechanical coupling 206 that is a secondary gear box 206'''. The electric output from the secondary generator 208 is directly coupled to the power lines 300 between the output of the primary generator 205 and the generator side converter end 302.

In the shown embodiment A, B, and C, the primary generator 205 is a Doubly Fed Induction Generator (DFIG) type generator. The secondary generator 208 is Permanent Magnet (PM) type generator such as a PMMS (Permanent Magnet Motor System), a PMHS (Permanent Magnet Hysteresis Synchronous), or a PMDD (Permanent Magnet Direct Drive).

Figure 4:
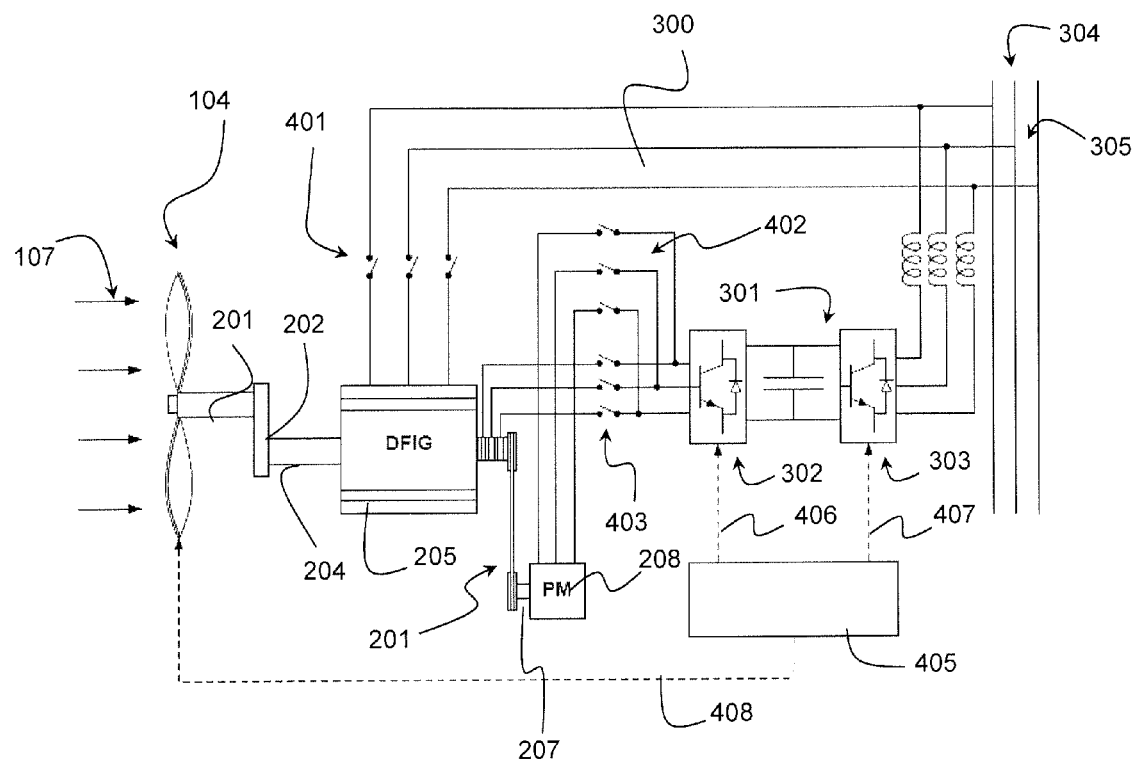
FIG. 4 shows a schematic of the controller and the switch.

FIG. 4 shows a representative embodiment of a control and switch configuration applied to the embodiment from FIG. 3 A.

In this embodiment, there is a first switch 401 arrangement in the power lines 300 between the primary generator 205 and the grid connection 305 point. The first switch 401 is configured to switch on and off electric power output from the primary generator 205 directly to the grid connection 305 point.

There is a secondary switch 402 arrangement between the secondary generator 208 and the generator side converter end 302 of the back-to-back converter 301. The second switch 402 is configured to switch on and off electric power output from the secondary generator 208 to the generator side converter end 302 of the back-to-back converter 301.

There is a third switch 403 arrangement between the primary generator 205 and the generator side converter end 302 of the back-to-back converter 301. The third switch 402 is configured to switch on and off electric power output from the secondary generator 208 to the generator side converter end 302 of the back-to-back converter 301.

In an alternative embodiment, the second switch 402 and the third switch 403 are configured as SPDT-switch.

The switches 401, 402, 403 are implied to be controlled by a controller 405. The controller 405 can be configured to control the generator side converter end 302 by generator side controls 406 so as to adapt the back-to-back converter 301 to the power flowing from the generators 205, 208 according to the positions of the switches 401, 402, 403.

Similarly, the controller 405 can be configured to control the grid side converter end 303 by grid side controls 407.

The controller 405 also controls the wind turbine 100 elements and in particular the rotation or operation of the wind turbine rotor 104 by means of rotor controls 408.

Figure 5:
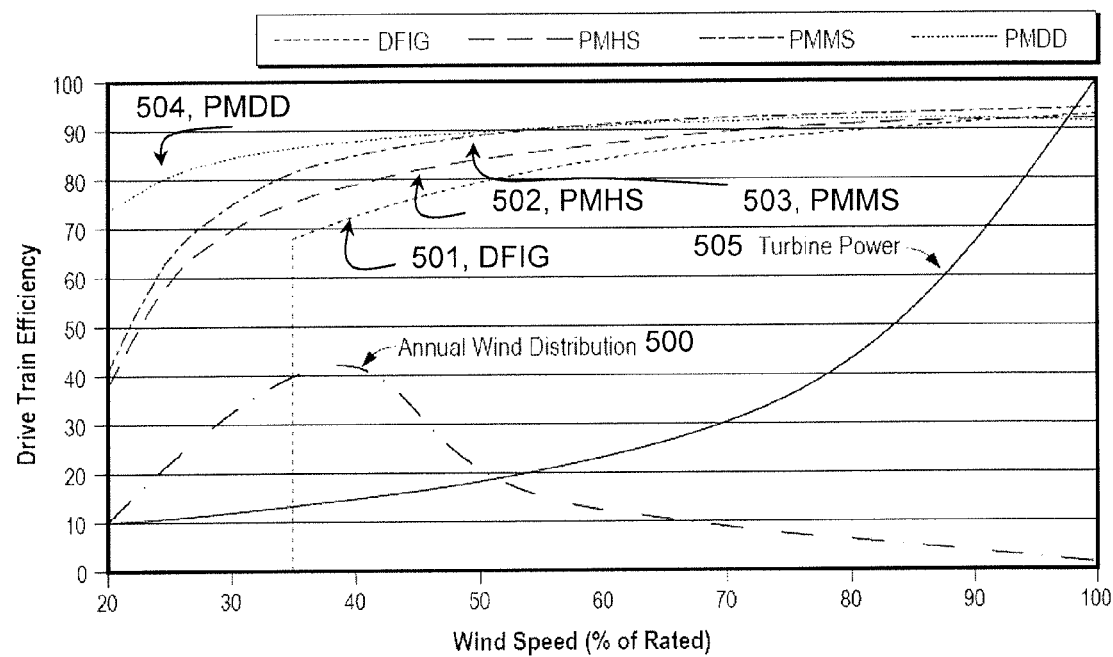
FIG. 5 shows a figure with the drive train efficiencies of DFIG, PMHS, PMMS, and PMDD generators as well as the annual wind distribution and turbine power as a function of the wind speed (% of rated power)

FIG. 5 shows as an example the efficiency of the drive train 200 of a wind turbine 100 of a standard 1.5 MW as a function of the wind speed 108 normalised to the rated power of the wind turbine 100.

The annual wind distribution 500 is indicated and seen to peak at about 39% of the rated power, before the annual wind distribution 500 slowly tails off.

The graph shows the DFIG drive train efficiency 501, which is seen to step-wise raise from 0% to about 68% at a rated wind speed 108 of about 35%, which is just below the peak of annual wind distribution 500, hence capturing the majority of the energy in the wind.

The graph shows the secondary generator 208 of the permanent magnet types drive train efficiencies: the PMHS drive train efficiency 502, the PMMS drive train efficiency 503, and the PMDD drive train efficiency 504.

The PM drive train efficiencies 502, 503, 504 show substantially efficiencies at wind speeds 108 below the cut-in wind speed 108 of the DFIG generator 205.

Finally, the graph shows the power curve of the wind turbine power 505 for a drive train 200 combining a primary generator 205 of the DFIG-type and a secondary generator 208 of the PM-type.

Figure 6:
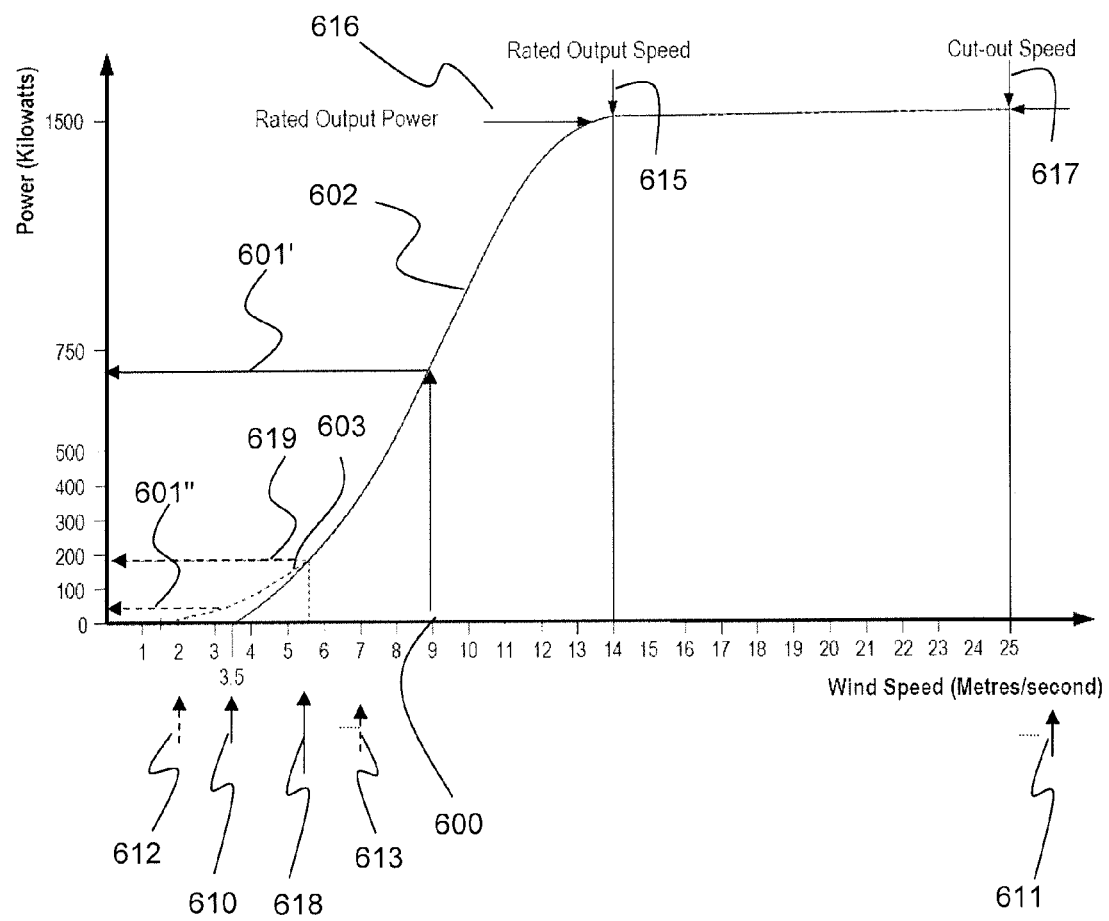
FIG. 6 shows a power curve of the combined output of the primary generator and the secondary generator.

FIG. 6 shows an example of a power curve of the combined output of a primary generator 205 and a secondary generator 206 as disclosed.

The graph shows the response of the wind turbine 100 for a particular wind speed, W, 600 where the wind turbine 100 generates a power output P, 601. The primary generator 205 contributes with a power $P_p$ 602, and the secondary generator 208 contributes with a power $P_s$ 603.

The primary generator 205 has a positive power output $P_p$ between a minimum wind speed $Wp_{MIN}$ 610 and a maximum wind speed $Wp_{MAX}$ 611. The secondary generator 208 has positive power output $P_s$ between a minimum wind speed $Ws_{MIN}$ 612 and a maximum wind speed $Ws_{MAX}$ 613.

The wind turbine 100 is configured so that it from a rated wind speed $W_{rated}$ 615 and above essentially produces the rated power $P_{rated}$ 616. The wind turbine 100 is further configured to cut out at a wind speed $W_{cut-out}$ 617 at which wind speed the wind turbine rotor is brought to a halt.

In particular, a person skilled in the art will be inspired and capable of choosing the permanent magnet PM generator as a PMMS (Permanent Magnet Motor System) type generator and make the appropriate configurations and controls.

Likewise, a person skilled in the art can chose PMHS (Permanent Magnet Hysteresis Synchronous) type, a PMDD (Permanent Magnet Direct Drive) type generators.

What is claimed is:

1. A wind turbine of variable speed type comprising:
    a wind turbine tower;
    a nacelle provided on said wind turbine;
    a wind turbine rotor hub rotatably mounted at said nacelle, said wind turbine rotor hub having at least one wind turbine blade mounted thereon;
    a shaft coupled to said wind turbine rotor hub and to, optionally through a gear box,
    a primary generator which via power lines has a primary stator electrically connected to a grid connection, and a primary rotor electrically connected to
    a back-to-back converter at a generator side converter end and wherein the back-to-back converter at a grid side converter end is electrically connected to the grid connection;
    wherein a secondary generator coupled to the shaft via a mechanical coupling and electrically connected to the primary rotor of the primary generator and to the generator side converter end of the back-to-back converter.

2. A wind turbine according to claim 1, wherein the primary generator is a DFIG-generator.

3. A wind turbine according to claim 1, wherein said secondary generator is a permanent magnet generator, such as a PMHS, PMMS, PMDD or alternative or equivalent permanent magnet generator.

4. A wind turbine according to claim 1, wherein said secondary generator has a maximum power output (Ps) of between 50 kW and 230 kW and/or the primary generator has a maximum power output (Pp) of at least 1 MW, preferably about 1.5 MW.

5. A wind turbine according to claim 1, wherein said wind turbine further comprises a controller with controlling capacities and connection means to:
    a first switch between the primary generator and the grid connection;
    a second switch between generator side end of the back-to-back converter and the secondary generator;
    a third switch between the generator side converter end of the back-to-back converter and the primary generator;
    and which controller and switches are configured to switch power on/off said primary generator and secondary generator to the back-to-back converter and a grid.

6. A wind turbine according to claim 1, wherein said controller is configured to control and continuously regulate at least one of the said switches for a power flow between off (zero power throughput) and on (max power throughput).

7. A wind turbine according to claim 1, wherein said controller further is configured to control said generator side converter end of back-to-back converter via generator side controls and/or to control said grid side converter end of back-to-back converter via grid side controls and/or to control the rotation of the wind turbine rotor by means of rotor controls.

8. A wind turbine according to claim 1, wherein said secondary generator comprises a secondary generator shaft mechanically coupled to a primary generator shaft; which mechanical coupling preferably is a toothed belt type coupling.

9. A wind turbine according to claim 1, wherein said secondary generator comprises a secondary generator shaft mechanically coupled directly to a primary generator shaft; which mechanical coupling preferably is a one-to-one directly coupling such as a shaft extension.

10. A wind turbine according to claim 1, wherein said secondary generator comprises a secondary generator shaft mechanically coupled by a coupling to the shaft; which mechanical coupling preferably is a secondary gear box type coupling.

11. Method of producing a wind turbine according to claims 1 comprising the steps of:
providing a wind turbine of the variable speed type comprising:
a wind turbine tower;
a nacelle provided on said wind turbine;
a wind turbine rotor hub rotatably mounted at said nacelle, said wind turbine rotor hub having at least one wind turbine blade mounted thereon;
a shaft coupled to said wind turbine rotor hub and to, optionally via a gear box,
a primary generator which via power lines has a primary stator electrically connected to a grid connection and a primary rotor electrically connected to
a back-to-back converter at a generator side converter end and which back-to-back converter at a grid side converter end is connected to the grid connection;
providing a secondary generator;
characterised by
retrofitting the secondary generator to the shaft or a primary generator shaft by a mechanical coupling and electrically connecting the secondary generator to the primary rotor of the primary generator and the back-to-back converter; and
retrofitting
a first switch between the primary generator and the grid connection;
a second switch between generator side end of the back-to-back converter and the secondary generator;
a third switch between the generator side converter end of the back-to-back converter and the primary generator;
and which controller and switches are configured to switch power on/off from said primary generator and secondary generators to the back-to-back converter and a grid;
retrofitting the controller to control the back-to-back converter via generator/grid side controls.

12. Method of producing a wind turbine according to claim 11 where the controller is further retrofitted to control the rotation of the wind turbine rotor by means of rotor controls.

13. Method of operating a wind turbine according to claim 1 and wherein
the primary generator is coupled to a wind turbine rotor and configured to give a power output $P_p$ when the wind turbine rotor experiences a wind speed between a minimum primary wind speed ($Wp_{MIN}$) and a maximum primary wind speed ($Wp_{MAX}$); and
the secondary generator is coupled to a wind turbine rotor and configured to give a power output ($P_s$) when the wind turbine rotor experiences a wind speed between a minimum secondary wind speed ($Ws_{MIN}$) and a maximum secondary wind speed ($Ws_{MAX}$);
and which primary generator and secondary generator are configured to produce a total power output (P); where the method of operating comprises the steps of
operating the wind turbine in a primary operation mode in which the power output (P) is from the primary generator when the wind speed is above a decoupling wind speed ($W_{decoupling}$);
operating the wind turbine in a secondary operation mode in which the power output (P) is from the secondary generator when the wind speed is below the decoupling wind speed ($W_{decoupling}$);
and where the decoupling wind speed ($W_{decoupling}$) is between the minimum primary wind speed ($Ws_{MIN}$) and the maximum secondary wind speed ($Ws_{MAX}$).

14. Method of operating a wind turbine according to claim 13 where the wind turbine switches from one to the other operation mode comprising the steps of:
detecting a passing of the decoupling wind speed ($W_{decoupling}$);
stopping the rotation of the wind turbine rotor of the wind turbine,
restarting the rotation of the wind turbine rotor of the wind turbine by
entering the primary operation mode if the wind speed (W) is at or above the decoupling wind speed ($W_{decoupling}$) or
entering the secondary operation mode if the wind speed (W) is below the decoupling wind speed ($W_{decoupling}$).

15. Method of operating a wind turbine according to claim 13 where the wind turbine switches from one to the other operation mode comprising the steps of:
reducing the power output (P) to zero whilst keeping the wind turbine rotor at a certain rotational speed;
switch on first switches and third switches to connect the primary generator to a grid and ramp the power to the required power level; and
operate in the primary operation mode;
or
switch on second switches to connect the second generator to a grid and ramp the power to the required power level; and
operate in the secondary operation mode.

* * * * *